(12) United States Patent
Gottschalk et al.

(10) Patent No.: US 10,029,744 B2
(45) Date of Patent: Jul. 24, 2018

(54) VEHICLE CAB SUSPENSION

(71) Applicant: Hendrickson USA, L.L.C., Itasca, IL (US)

(72) Inventors: Michael J. Gottschalk, Newark, OH (US); Scott Allen Massa, Naperville, IL (US)

(73) Assignee: Hendrickson USA, L.L.C., Itasca, IL (US)

( * ) Notice: Subject to any disclaimer, the term of this patent is extended or adjusted under 35 U.S.C. 154(b) by 0 days.

(21) Appl. No.: 13/803,444

(22) Filed: Mar. 14, 2013

(65) Prior Publication Data

US 2014/0265075 A1 Sep. 18, 2014

(51) Int. Cl.
*B62D 33/06* (2006.01)
*B60G 11/22* (2006.01)
*F16F 15/08* (2006.01)
*B60G 99/00* (2010.01)

(52) U.S. Cl.
CPC .......... *B62D 33/0604* (2013.01); *B60G 11/22* (2013.01); *B60G 99/002* (2013.01); *B60G 99/004* (2013.01); *F16F 15/08* (2013.01); *B60G 2202/143* (2013.01); *B60G 2204/125* (2013.01); *B60G 2204/162* (2013.01)

(58) Field of Classification Search
CPC .... F16F 15/04; F16F 1/36; F16F 1/373; F16F 1/3737; F16F 1/38; F16F 1/28; B60G 11/22; B60G 99/002; B60G 99/004; B60G 2002/142; B60G 2002/143; B60G 2002/1422; B60G 11/24; B60G 11/38; B60G 11/40; B60G 2202/14; B60G 2204/125; B60G 2204/41; B60G 2204/4102; B60G 2204/4103; B60G 2204/41043; B60G 2204/41044; B60G 2204/4108; B60G 2204/4502; B62D 55/1086; B62D 33/071; B62D 33/0604
USPC .............................. 267/292–294, 141, 141.1
See application file for complete search history.

(56) References Cited

U.S. PATENT DOCUMENTS

| | | | | |
|---|---|---|---|---|
| 2,127,935 A | * | 8/1938 | Pflager et al. | 105/190.2 |
| 2,137,543 A | * | 11/1938 | Piron | 105/224.1 |
| 2,165,702 A | * | 7/1939 | Haushalter | 267/294 |
| 2,216,715 A | * | 10/1940 | Ledwinka | 267/294 |
| 2,322,879 A | | 6/1943 | Piron | |

(Continued)

FOREIGN PATENT DOCUMENTS

FR 851859 A * 1/1940
WO WO 2008152284 A1 * 12/2008 ................ F16F 1/36

OTHER PUBLICATIONS

MOR/ryde RS, MOR/ryde "The Airless Suspension", www.mor-ryde.com.
International Preliminary Report on Patentability dated Sep. 15, 2015 for International Application No. PCT/US2014/025257.

*Primary Examiner* — Anna M Momper
(74) *Attorney, Agent, or Firm* — Cook Alex Ltd.

(57) ABSTRACT

A vehicle cab suspension is provided with a body having a mounting member positioned at least partially within the body. One or more resilient members connect the body to the mounting member and are placed in a compressed condition between the body and the mounting member when the vehicle cab suspension is in an unloaded condition. The body may be formed of first and second body pieces, each of which may be provided with upper and/or lower projections to restrict movement of the resilient members during use.

23 Claims, 4 Drawing Sheets

(56) References Cited

U.S. PATENT DOCUMENTS

| | | | |
|---|---|---|---|
| 2,432,050 A | 12/1947 | Thiry | |
| 2,665,864 A * | 1/1954 | Mooney | 267/141 |
| 2,942,872 A | 6/1960 | Muller | |
| 3,012,768 A * | 12/1961 | Heinmiller | B60G 11/22 |
| | | | 267/292 |
| 3,410,573 A * | 11/1968 | Hickman | B60G 5/04 |
| | | | 267/257 |
| 3,482,852 A * | 12/1969 | Hickman | B60G 9/04 |
| | | | 267/257 |
| 3,495,848 A * | 2/1970 | Hickman | B60G 9/04 |
| | | | 267/257 |
| 3,678,864 A | 7/1972 | Gutridge | |
| 3,713,666 A | 1/1973 | Cheers et al. | |
| 3,764,184 A * | 10/1973 | Orr | B62D 55/1086 |
| | | | 305/138 |
| 3,841,694 A | 10/1974 | Merkle | |
| 3,856,325 A | 12/1974 | Willetts | |
| 4,135,757 A | 1/1979 | Smith et al. | |
| 4,166,611 A * | 9/1979 | Geers | B60G 11/22 |
| | | | 105/218.1 |
| 4,572,490 A | 2/1986 | Alciati | |
| 4,725,046 A | 2/1988 | Sugino | |
| 4,886,255 A | 12/1989 | Paton | |
| 5,028,038 A | 7/1991 | de Fontenay | |
| 5,074,535 A | 12/1991 | Colford | |
| 5,109,939 A | 5/1992 | Conaway et al. | |
| 5,195,728 A | 3/1993 | Skipper | |
| 5,209,316 A | 5/1993 | Bauer | |
| 5,570,286 A | 10/1996 | Margolis et al. | |
| 5,641,153 A | 6/1997 | Gwinn | |
| 5,732,370 A | 3/1998 | Boyle et al. | |
| 5,988,610 A | 11/1999 | Hiraki et al. | |
| 6,050,555 A * | 4/2000 | Gartner et al. | 267/141 |
| 6,176,478 B1 | 1/2001 | Heitzmann | |
| 6,311,110 B1 | 10/2001 | Ivers et al. | |
| 6,450,473 B1 | 9/2002 | Kondo et al. | |
| 6,478,321 B1 * | 11/2002 | Heitzmann | B60G 5/047 |
| | | | 267/219 |
| 6,695,294 B2 | 2/2004 | Miller et al. | |
| 6,725,957 B2 | 4/2004 | Sutton | |
| 6,758,294 B2 | 7/2004 | Peddycord et al. | |
| 7,044,559 B2 | 5/2006 | Ropp et al. | |
| 7,232,180 B2 | 6/2007 | Biasiotto et al. | |
| 7,300,100 B2 | 11/2007 | McLean et al. | |
| 7,703,840 B2 | 4/2010 | Fukunaga et al. | |
| 7,926,836 B2 | 4/2011 | Noble et al. | |
| 2003/0151181 A1 * | 8/2003 | Romer | B60G 13/003 |
| | | | 267/220 |
| 2006/0055094 A1 | 3/2006 | Attinello et al. | |
| 2006/0131801 A1 | 6/2006 | Barickman et al. | |
| 2008/0136135 A1 | 6/2008 | Maciak | |
| 2008/0157565 A1 | 7/2008 | Bakshi | |
| 2009/0167057 A1 | 7/2009 | Walter et al. | |
| 2009/0179362 A1 * | 7/2009 | Ebert et al. | 267/293 |
| 2009/0184448 A1 | 7/2009 | Hiser | |
| 2009/0289472 A1 | 11/2009 | Catanzarite et al. | |
| 2010/0257758 A1 | 10/2010 | Bengtsson et al. | |

* cited by examiner

VEHICLE CAB SUSPENSION

BACKGROUND

Field of the Disclosure

The present subject matter relates to suspension systems for controlling movement of a vehicle cab with respect to the associated vehicle frame.

Description of Related Art

Applications calling for the use of heavy duty vehicles commonly result in significant vibrations and impacts applied to the vehicle. Suspension systems seek to prevent impact- or vibration-based damage to the vehicle, while providing a smoother ride. However, additional consideration is needed to improve the comfort of a driver or passenger in the vehicle cab by isolating the driver or passenger from the vibrations and impacts. To that end, a number of vehicle cab suspension systems have been proposed. Examples of known vehicle cab suspension systems are described in greater detail in U.S. Pat. No. 5,074,535 to Colford; U.S. Pat. No. 6,695,294 to Miller et al.; and U.S. Pat. No. 7,926,836 to Noble et al. and U.S. Patent Application Publication Nos. 2008/0136135 to Maciak and 2008/0157565 to Bakshi, all of which are hereby incorporated herein by reference.

SUMMARY

There are several aspects of the present subject matter which may be embodied separately or together in the devices and systems described and claimed below. These aspects may be employed alone or in combination with other aspects of the subject matter described herein, and the description of these aspects together is not intended to preclude the use of these aspects separately or the claiming of such aspects separately as set forth in the claims appended hereto.

In one aspect, a vehicle cab suspension comprises a body, with a mounting member positioned at least partially within the body. A resilient member connects the body to the mounting member and is placed in a compressed condition between the body and the mounting member when the vehicle cab suspension is in an unloaded condition.

In another aspect, a vehicle cab suspension comprises a body, with a mounting member positioned at least partially within the body. A plurality of resilient members connect the body to the mounting member, with the body including at least one lower projection positioned below the resilient members and configured to restrict movement of at least one of the resilient members during use.

In yet another aspect, a vehicle cab suspension comprises a body, with a mounting member positioned at least partially within the body. A plurality of resilient members connect the body to the mounting member, with the body including at least one upper projection positioned above the resilient members and configured to restrict movement of at least one of the resilient members during use.

DESCRIPTION OF THE ILLUSTRATED EMBODIMENTS

The embodiments disclosed herein are for the purpose of providing a description of the present subject matter, and it is understood that the subject matter may be embodied in various other forms and combinations not shown in detail. Therefore, specific designs and features disclosed herein are not to be interpreted as limiting the subject matter as defined in the accompanying claims.

Figures 3, 4:
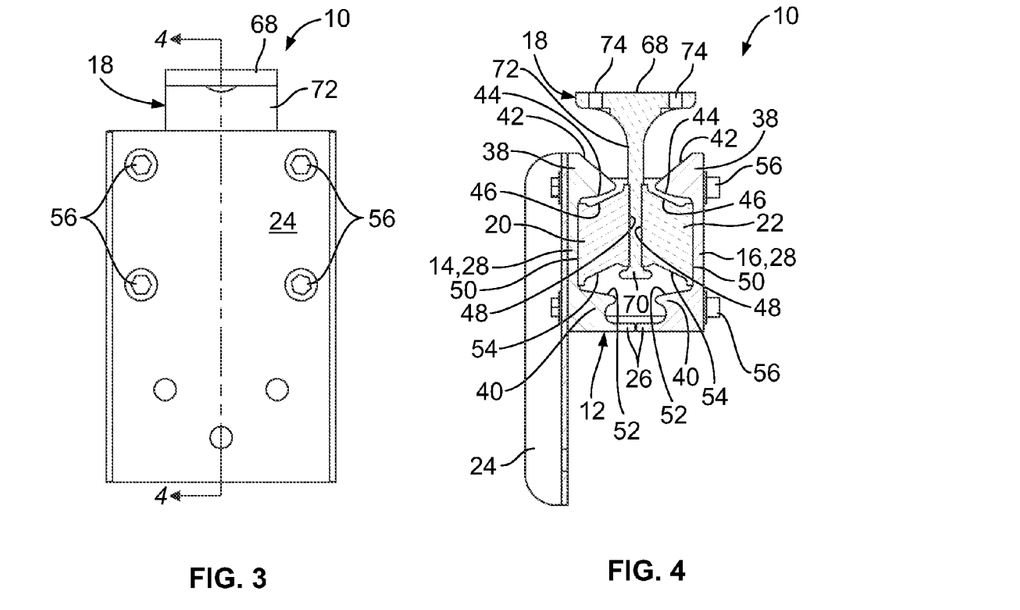
FIG. 3 is a side elevational view of the vehicle cab suspension of FIG. 1.
FIG. 4 is a cross-sectional view of the vehicle cab suspension of FIG. 1, taken through the line 4-4 of FIG. 3.
Figure 5:
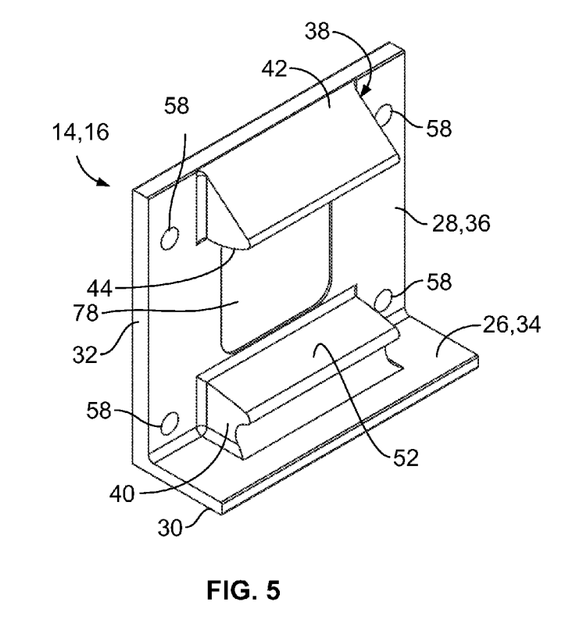
FIG. 5 is a perspective view of a body piece of the vehicle cab suspension of FIG. 1.
Figure 6:
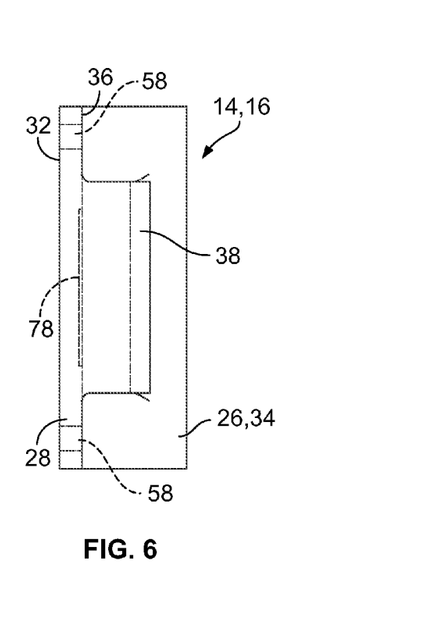
FIG. 6 is a top plan view of the body piece of FIG. 5.

FIGS. 1-4 show selected components of a vehicle cab suspension 10 incorporating aspects of the present disclosure. The vehicle cab suspension 10 includes a body 12 which, in the illustrated embodiment, is comprised of a first body piece 14 and a second body piece 16 (FIGS. 5-8). In other embodiments, the body 12 may be provided with a single-piece construction. The body 12 defines an open interior in which at least a portion of a mounting member 18 (FIGS. 9-12) may be positioned or received. The illustrated mounting member 18 is connected to the body 12 by plurality of resilient members (FIG. 4). In the illustrated embodiment, in which the body 12 is comprised of first and second body pieces 14 and 16, the first body piece 14 is connected to the mounting member 18 by a first resilient member 20 and the second body piece 16 is connected to the mounting member 18 by a second resilient member 22.

A portion of the vehicle cab suspension 10 is connected to a portion of a vehicle frame 24, while another portion of the vehicle cab suspension 10 is connected to a portion of a vehicle cab (not illustrated) to dampen vibrations and impacts transmitted to the vehicle cab from the vehicle frame 24. In the illustrated embodiment, the body 12 is connected to the vehicle frame 24 (FIGS. 1-4) and the mounting member 18 is connected to a portion of the vehicle cab. In other embodiments, the mounting member 18 may be connected to the vehicle frame 24, with the body 12 being connected to the vehicle cab.

FIGS. 5-8 illustrate a first or second body piece 14, 16, as the first and second body pieces 14 and 16 may be substantially identical. However, it is also within the scope of the present disclosure for the first and second body pieces to be differently configured. The first and second body pieces 14 and 16 and the individual portions thereof may be made from a variety of materials. In one embodiment, the first and second body pieces 14 and 16 are comprised of a relatively rigid material, which may be a metallic material, such as (but not limited to) an aluminum material. The first and second body pieces 14 and 16 may each be formed as integrated members (e.g., by a casting process) or may have a composite construction, formed from a plurality of elements (e.g., by fabricating a body piece by welding or otherwise securing various plates and/or elements together). It is also within the scope of the present disclosure for the first and second body pieces 14 and 16 to be combined in the form of an integrated, single-piece body 12 of the vehicle cab suspension 10.

Figures 1, 2:
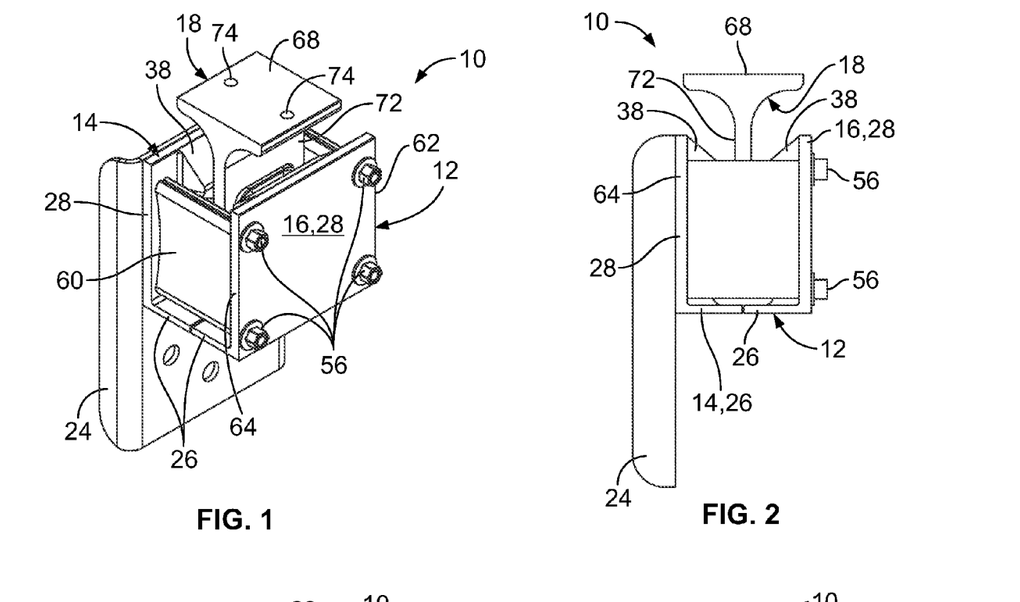
FIG. 1 is a perspective view of a vehicle cab suspension according to an aspect of the present disclosure.
FIG. 2 is a front elevational view of the vehicle cab suspension of FIG. 1.
Figure 7:
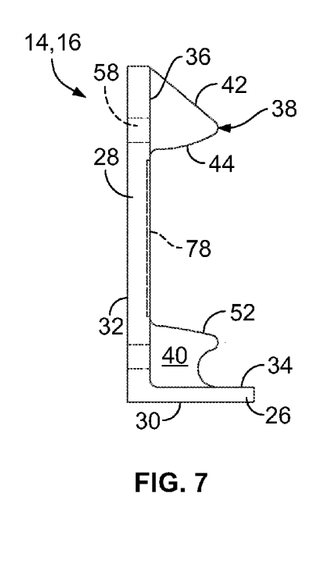
FIG. 7 is a front elevational view of the body piece of FIG. 5.
Figure 8:
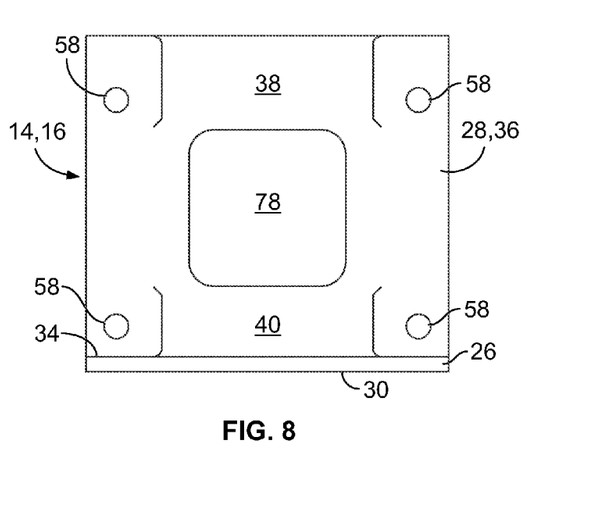
FIG. 8 is a side elevational view of the body piece of FIG. 5.
Figure 9:
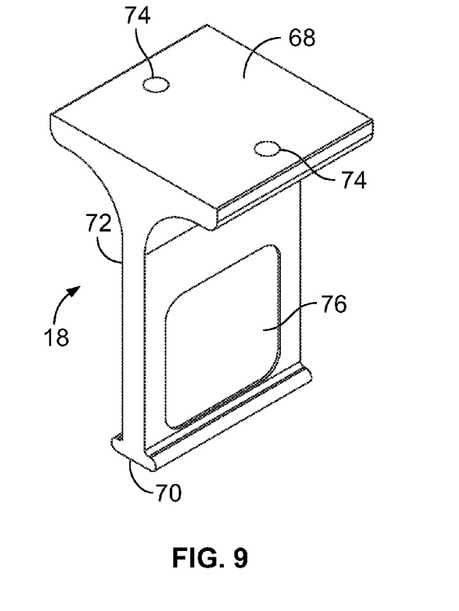
FIG. 9 is a perspective view of a mounting member of the vehicle cab suspension of FIG. 1.
Figure 10:
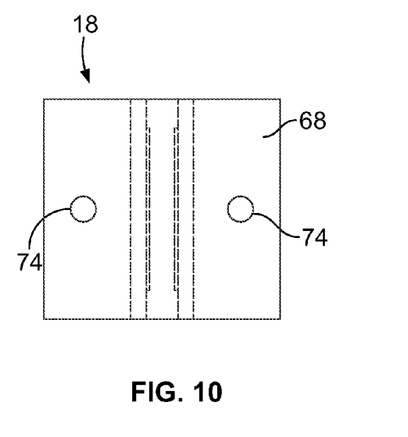
FIG. 10 is a top plan view of the mounting member of FIG. 9.
Figure 11:
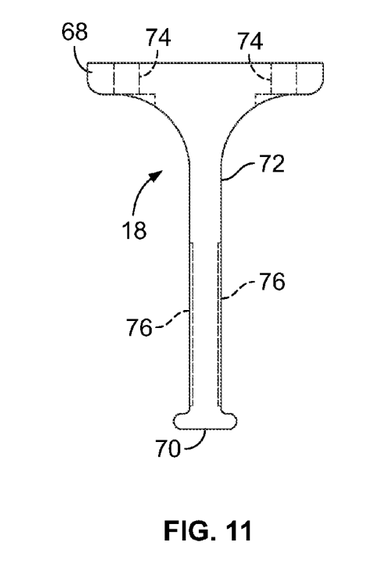
FIG. 11 is a front elevational view of the mounting member of FIG. 9.
Figure 12:
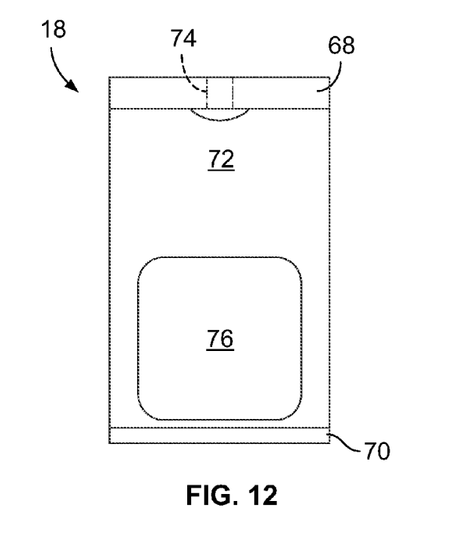
FIG. 12 is a side elevational view of the mounting member of FIG. 9.

The illustrated body piece 14, 16 of FIGS. 5-8 has a generally horizontal portion or wall 26 and a generally vertical portion or wall 28. As used herein, terms of direction (e.g., horizontal, vertical, upper, lower, etc.) refer to the orientation of the vehicle cab suspension 10 when secured to a vehicle frame 24, as shown in FIG. 1. In one embodiment, the generally horizontal portion 26 and the generally vertical portion 28 may meet at or adjacent to a lateral or side edge of the generally horizontal portion 26 and at or adjacent to a bottom or lower edge of the generally vertical portion 28, thereby forming a generally L-shaped profile or cross-section (FIG. 7). Other configurations may also be employed without departing from the scope of the present disclosure.

The outer surfaces 30 and 32 of the generally horizontal portion 26 and the generally vertical portion 28 may be generally flat or planar. Such a configuration may be advantageous for securing the body 12 to the vehicle frame 24 or the vehicle cab. For example, if the generally vertical portion 28 of one or both of the body pieces 14, 16 is to be connected to the vehicle frame 24 (as in FIGS. 1-4) or the vehicle cab, the outer surface 32 of the generally vertical portion 28 may be generally flat or planar for a better fit to a generally flat or planar portion of the vehicle frame 24 or the vehicle cab. Similarly, if the generally horizontal portion 26 of one or both of the body pieces 14, 16 is to be connected to the vehicle frame 24 or the vehicle cab, the outer surface 30 of the generally horizontal portion 26 may be generally flat or planar for a better fit to a generally flat or planar portion of the vehicle frame 24 or the vehicle cab. In another embodiment, the outer surface(s) of the body piece(s) may be contoured or non-planar or otherwise include one or more features configured to cooperate with the portion of the vehicle frame or vehicle cab to which the body is to be secured.

One or both of the inner surfaces 34 and 36 of the generally horizontal portion 26 and/or the generally vertical portion 28 of one or both of the body pieces 14 and 16 may include a projection. In the illustrated embodiment, the generally vertical portion 28 of each body piece 14, 16 includes an inner surface 34 with an upper projection 38 extending therefrom and positioned above the resilient members 20 and 22. In the illustrated embodiment, each body piece 14, 16 includes a lower projection 40 extending from the inner surfaces 34 and 36 of the generally horizontal and generally vertical portions 26 and 28 at the location where the generally horizontal and generally vertical portions 26 and 28 meet, below the resilient members 20 and 22. In other embodiments, one of the body pieces (or one side of the body) may have only one projection, with the other body piece (or other side of the body) having one, two, or no projections. In other embodiments, one of the body pieces (or one side of the body) may have upper and lower projections, with the other body piece (or other side of the body) having one or no projections.

FIG. 4 illustrates a pair of substantially identical upper projections 38. However, if the body 12 is provided with two upper projections, it is also within the scope of the present disclosure for the upper projections to be differently configured. The illustrated upper projections 38 have an upper or top surface 42 and a lower or bottom surface 44. The upper surface 42 may be variously configured, but it may be advantageous for the upper surface 42 to be configured so as not to come into contact with or otherwise interfere with movement of the mounting member 18 during use of the vehicle cab suspension 10. In the illustrated embodiment, the upper surface 42 is provided as a generally planar inclined or angled surface, with a maximum elevation at an outer end and a minimum elevation at an inner end. Other configurations of the upper surface of the upper projection may also be practiced without departing from the scope of the present disclosure.

The lower surface 44 of the upper projection 38 is configured to restrict movement and/or deformation of the associated resilient member (i.e., the first resilient member 20 if the upper projection 38 is associated with the first body piece 14 or the second resilient member 22 if the upper projection 38 is associated with the second body piece 16) during use. The lower surface 44 of the upper projection 38 is preferably configured to allow for some upward movement or deformation of the associated resilient member prior to the resilient member contacting the upper projection 38. Accordingly, the upper projection 38 may be configured and oriented to establish a gap or space between the lower surface 44 and the associated resilient member 20, 22.

The performance of the vehicle cab suspension 10 is affected by the amount or percentage of the resilient member upper surface 46 (FIG. 4) in contact with the lower surface 44 of the upper projection 38 at a given upward deformation of the resilient member from its original configuration. An inner end 48 of each resilient member 20, 22 is connected to the mounting member 18, while an outer end 50 of each resilient member 20, 22 is connected to the associated body portion 14, 16. Moving the mounting member 18 upwardly a given distance with respect to the body 12 causes the attached resilient members 20 and 22 to deform a given amount to follow the motion of the mounting member 18. Depending on the location of the upper projections 38 with respect to the resilient members 20 and 22 and the configuration of the lower surface 44 of the upper projections 38, a different amount or percentage of the upper surface 46 of the resilient members 20 and 22 will come into contact with the lower surface 44 of the upper projections 38. For example, in one configuration, approximately 5% of the upper surface 46 of the resilient member 20, 22 may come into contact with the lower surface 44 of the associated upper projection 38 upon a given upward deformation whereas, in other configurations, the same deformation may instead cause approximately 3% or 7% of the resilient member upper surface 46 to come into contact with the upper projection 38. It will be understood by those of ordinary skill in the art that the amount or percentage of contact between the resilient member 20, 22 and the upper projection 38 is a factor in the amount and/or type of motion or deformation restriction provided by the upper projection 38. The configuration of the gap or space between the upper projection 38 and the associated resilient member 20, 22 may be designed so as to control the contact therebetween. For example, the distance between the lower surface 44 of the upper projection 38 and the upper surface 46 of the associated resilient member 20, 22 may be either generally uniform or non-uniform. By controlling the configuration of the gap, it is possible to tune the performance of the vehicle cab suspension 10 to the desired specifications.

In addition to the amount or percentage of contact between the resilient member and the projection, there are other factors to consider and control, depending on the preferred performance of the vehicle cab suspension 10. For example, the location of the contact (e.g., whether there is contact at a generally outer location or at a generally inner location or at a generally central location) can modify the motion or deformation restriction provided by the projection. Further, the degree which the contact percentage changes upon additional or less displacement or deformation (e.g., whether an additional quarter inch of upward deformation of the resilient member results in the contact percentage changing from approximately 5% to 6% or from approximately 5% to 7%) can also modify the motion or deformation restriction provided by the projection. All of these factors may be controlled by varying the configuration of the gap and the configuration and/or composition of the upper projection 38 and/or the associated resilient member 20, 22.

In the illustrated embodiment, the lower surfaces 44 of the upper projections 38 have a different contour or configuration than the upper surfaces 46 of the resilient members 20 and 22, causing there to be a non-uniform gap or separation or distance therebetween. In the illustrated embodiment, the upper surfaces 46 of the resilient members 20 and 22 are provided as generally planar inclined or angled surfaces in an unloaded condition (i.e., without a vehicle cab being supported by the vehicle cab suspension 10), with a maximum elevation at an inner end 48 (which is connected to the mounting member 18) and a minimum elevation at an outer end 50 (which is connected to the body 12). In contrast, the illustrated upper projections 38 have outwardly curved or convex lower surfaces 44, resulting in a non-uniform distance between the lower surfaces 44 of the upper projections 38 and the upper surface 46 of the associated resilient member 20, 22. The exact distance between the upper projections 38 and the resilient members 20 and 22 at the different points between the outer and inner ends of the gaps therebetween depends on the particular configuration of the lower surfaces 44 of the upper projections 38 and the upper surfaces 46 of the resilient members 20 and 22.

In addition to showing two substantially identical upper projections 38, FIG. 4 also illustrates a pair of substantially identical lower projections 40. However, if the body 12 is provided with a pair of lower projections, it is also within the scope of the present disclosure for the lower projections to be differently configured. The illustrated lower projections 40 are shown as being in association with both the generally horizontal and generally vertical portions 26 and 28 of the associated body piece 14, 16. However, it is within the scope of the present disclosure for a lower projection to be associated with only one of the inner surfaces 34, 36 of the body. For example, in one embodiment, a lower projection may extend from the generally vertical portion of the body, while being spaced away from the generally horizontal portion of the body. In another embodiment, a lower projection may extend from the generally horizontal portion of the body, while being spaced away from the generally vertical portion of the body. However, it may be preferred for the lower projections to be associated with both the generally vertical and generally horizontal portions of the body or a body piece, as in the illustrated embodiment, for improved stability and strength.

The lower projection 40 includes an upper or top surface 52, which may be variously configured. The upper surface 52 of the lower projection 40 is configured to restrict movement and/or deformation of the associated resilient member (i.e., the first resilient member 20 if the lower projection 40 is associated with the first body piece 14 or the second resilient member 22 if the lower projection 40 is associated with the second body piece 16) during use. The upper surface 52 of the lower projection 40 is preferably configured to allow for some downward movement or deformation of the associated resilient member prior to the resilient member contacting the lower projection 40. Accordingly, the lower projection 40 may be configured and oriented to establish a gap or space between the upper surface 52 and the associated resilient member 20, 22.

As is the case with the upper projection 38, the performance of the vehicle cab suspension 10 is affected by the amount or percentage of the resilient member in contact with the upper surface 52 of the lower projection 40 at a given downward deformation of the resilient member from its original configuration. For example, if upon deforming downwardly a given distance, approximately 5% of a lower surface 54 of the resilient member 20, 22 is in contact with the upper surface 52 of the lower projection 40, the lower projection 40 will provide a different motion or deformation restriction than if approximately 3% or 7% of the resilient member lower surface 54 is in contact with the lower projection 40. The configuration of the gap or space between the lower projection 40 and the associated resilient member 20, 22 may be designed so as to control the contact therebetween. For example, the distance between the upper surface 52 of the lower projection 40 and the lower surface 54 of the associated resilient member 20, 22 may be either generally uniform or non-uniform. By controlling the configuration of the gap, it is possible to tune the performance of the vehicle cab suspension 10 to the desired specifications.

As described above with respect to the upper projection 38, other design factors of the lower projections 40 and the resilient member 20 and 22 also affect the performance of the vehicle cab suspension 10. For example, the location of the contact therebetween (e.g., whether there is contact at a generally outer location or at a generally inward location or at a generally central location) can modify the motion or deformation restriction provided by the lower projection. Further, the degree which the contact percentage changes upon additional or less displacement or deformation (e.g., whether an additional quarter inch of downward deformation of the resilient member results in the contact percentage changing from approximately 5% to 6% or from approximately 5% to 7%) can also modify the motion or deformation restriction provided by the lower projection. All of these factors may be controlled by varying the configuration of the gap and the configuration and/or composition of the lower projection 40 and/or the associated resilient member 20, 22.

In the illustrated embodiment, the upper surfaces 52 of the lower projection 40 have a different contour or configuration than the lower surfaces 54 of the resilient members 20 and 22, causing there to be a non-uniform gap or separation or distance therebetween. In the illustrated embodiment, the lower surfaces 54 of the resilient members 20 and 22 are provided as generally planar inclined or angled surfaces in an unloaded condition (i.e., without a vehicle cab being supported by the vehicle cab suspension 10), with a maximum elevation at an inner end 48 (which is connected to the mounting member 18) and a minimum elevation at an outer end 50 (which is connected to the body 12). In contrast, the illustrated lower projections 40 have outwardly curved or convex upper surfaces 52, resulting in a non-uniform distance between the upper surfaces 52 of the lower projections 40 and the lower surfaces 54 of the resilient members 20 and 22. The exact distance between the lower projections 40 and the resilient members 20 and 22 at the different points between the outer and inner ends of the gap therebetween depends on the particular configuration of the upper surfaces 52 of the lower projections 40 and the lower surfaces 54 of the resilient members 20 and 22.

In the illustrated embodiment, the distance between the resilient members 20 and 22 and the lower projections 40 is different than the distance between the resilient members 20 and 22 and the upper projections 38 when the vehicle cab suspension 10 is in an unloaded condition. This may have the effect of allowing a different amount of vertical displacement or deformation of the resilient members 20 and 22 prior to them coming into contact with the upper versus the lower projections. In other embodiments, the resilient members 20 and 22 may be approximately equidistant from the upper and lower projections 20 and 22 when the vehicle cab suspension 10 is in an unloaded condition.

The distance between the resilient members 20 and 22 and the projections 38 and 40 depends on a number of factors, including the location and configuration of the projections 38 and 40, as described above, as well as the location and configuration of the resilient members 20 and 22. For example, in the illustrated embodiment, each resilient member 20, 22 is configured with an inner end surface 48 (which may be substantially vertical) connected to the mounting member 18 and an outer end surface 50 (which may be substantially vertical) connected to the body 12 (FIG. 4). In the illustrated embodiment, the ends 48 and 50 of the resilient members 20 and 22 are positioned at different elevations when the vehicle cab suspension 10 is in an unloaded condition. In particular, the outer end 50 of each resilient member 20, 22 is positioned at a lower elevation than the inner end 48 when the vehicle cab suspension 10 is in an unloaded condition. In the illustrated embodiment, this configuration is achieved by providing resilient members 20 and 22 having a cross-section or profile which defines a generally rhomboidal shape when the vehicle cab suspension 10 is in an unloaded condition. Such an angled or inclined configuration may be advantageous because, upon loading the vehicle cab suspension 10 with a vehicle cab, the mounting member 18 will be downwardly displaced and the resilient members 20 and 22 downwardly deformed, thereby placing the resilient members 20 and 22 in a more horizontal configuration that may be better suited for dampening both upward and downward applied forces and impacts.

The load applied to the vehicle cab suspension 10 (and, hence, the resilient members 20 and 22) by a vehicle cab in a loaded condition varies depending on the nature of the vehicle cab. For example, a heavier cab will apply a greater force than a lighter cab, thereby causing a greater downward deformation of the resilient members 20 and 22 and a greater downward displacement of the mounting member 18. Thus, if the resilient members are intended to have a generally inclined or angled configuration in an unloaded condition and a generally horizontal configuration in a loaded condition, it may be advantageous to consider the nature of the vehicle cab during the design process to ensure that the resilient members assume the desired inclination when the vehicle cab is connected to the vehicle cab suspension.

While a preferred configuration is illustrated, it is also within the scope of the present disclosure for the resilient members to have other configurations. For example, the resilient members may be configured such that their ends are positioned at approximately the same elevation when the vehicle cab suspension is in an unloaded condition. The resilient members may also have non-rhomboidal cross-sections or profiles. Furthermore, although it may be preferable for the resilient members to be substantially identical and connected to the other components of the vehicle cab suspension in the same way, it is also within the scope of the present disclosure for at least one resilient member to have a different configuration and be connected to the associated body piece and mounting member differently than another resilient member.

In the illustrated embodiment, the resilient members 20 and 22 are positioned closer to the upper projections 38 than to the lower projections 40 when the vehicle cab suspension 10 is in an unloaded condition. In other embodiments, the resilient members may be positioned closer to the lower projections than to the upper projections or approximately equidistant from the upper and lower projections when the vehicle cab suspension is in an unloaded condition. However, the illustrated configuration may be preferred because, upon loading the vehicle cab suspension 10 with a vehicle cab, the mounting member 18 will be downwardly displaced and the resilient members 20 and 22 downwardly deformed, thereby placing the resilient members 20 and 20 into a more centered location with respect to the upper and lower projections 38 and 40. The load applied to the vehicle cab suspension 10 (and, hence, the resilient members 20 and 22) by a vehicle cab in a loaded condition varies depending on the nature of the vehicle cab. For example, a heavier cab will apply a greater force than a lighter cab, thereby causing a greater downward displacement of the mounting member 18 and greater downward deformation of the resilient members 20 and 22. Thus, it may be advantageous to consider the nature of the vehicle cab when designing the vehicle cab suspension 10 to ensure that the resilient members 20 and 22 and the mounting member 22 are positioned at the preferred height when the vehicle cab is connected to the vehicle cab suspension 10.

According to one aspect of the present disclosure, the vehicle cab suspension 10 is configured such that the resilient members 20 and 22 are always in a compressed condition, regardless of whether the vehicle cab suspension 10 itself is in a loaded or an unloaded condition. Stated differently, the non-compressed width or length of each resilient member 20, 22 (i.e., the distance between the inner and outer ends 48 and 50) is greater than the distance between the surfaces to which the ends 48 and 50 of the resilient members 20 and 22 are connected. Thus, the uncompressed width or length of the first resilient member 20 is greater than the distance between the generally vertical portion 28 of the first body piece 14 and the mounting member 18, such that the first resilient member 20 must be compressed to fit in that space. Similarly, the uncompressed width or length of the second resilient member 22 is greater than the distance between the generally vertical portion 28 of the second body piece 16 and the mounting member 18, such that the second resilient member 22 must be compressed to fit in that space.

The manner in which the resilient members 20 and 22 are placed into a compressed condition may vary according to the configuration of the vehicle cab suspension 10. In one method of assembling a vehicle cab suspension 10 having a body 12 comprised of first and second body pieces 14 and 16, the internal components of the vehicle cab suspension 10 (i.e., the resilient members 20 and 22 and the mounting member 18) may be connected together and to the body pieces 14 and 16, as appropriate, with the resilient members 20 and 22 in a non-compressed condition. Thereafter, the body pieces 14 and 16 may be brought together and secured to each other, thereby placing the resilient members 20 and 22 in a compressed condition.

In another embodiment, the first and second body pieces 14 and 16 may be replaced by an integrated, single-piece body 12. If a single-piece body 12 is provided, the resilient members 20 and 22 may be maintained in a compressed condition prior to and during placement of them into the interior of the body 12. Alternatively, the resilient members 20 and 22 may be placed into the interior of the body 12 in an uncompressed condition and then compressed by a mechanism applying a compressive force from within the interior of the body 22. In the interest of simplifying the assembly process, it may be preferable to provide the vehicle cab suspension 10 with two body pieces 14 and 16, rather than a single-piece body 16, because compressing the resilient members 20 and 22 by external means (e.g., as a part of connecting the body pieces 14 and 16 together) may be easier than compressing them prior to or after insertion into a single-piece body 12.

If the vehicle cab suspension 10 is provided with two body pieces 14 and 16 instead of a single-piece body, the two body pieces 14 and 16 may be connected by any of a variety of means, such as the use of mechanical fasteners or a welding procedure or an adhesion process or an interference or friction fit. Non-permanent fixation methods (e.g., the use of mechanical fasteners) may be preferable to permanent fixation methods (e.g., welding) for purposes of disassembling and servicing the vehicle cab suspension 10, if need be. In the illustrated embodiment, the body pieces 14 and 16 are connected by mechanical fasteners 56 (FIGS. 1-4), with the generally vertical portions 28 including one or more holes or apertures 58 configured to accommodate the mechanical fasteners 56 (FIGS. 5-8). If other means are employed to connect the body pieces 14 and 16 (e.g., a welding or adhesion process or an interference or friction fit), the holes 58 may be omitted and/or replaced with other features configured to cooperate with the selected connection means.

Figure 13:
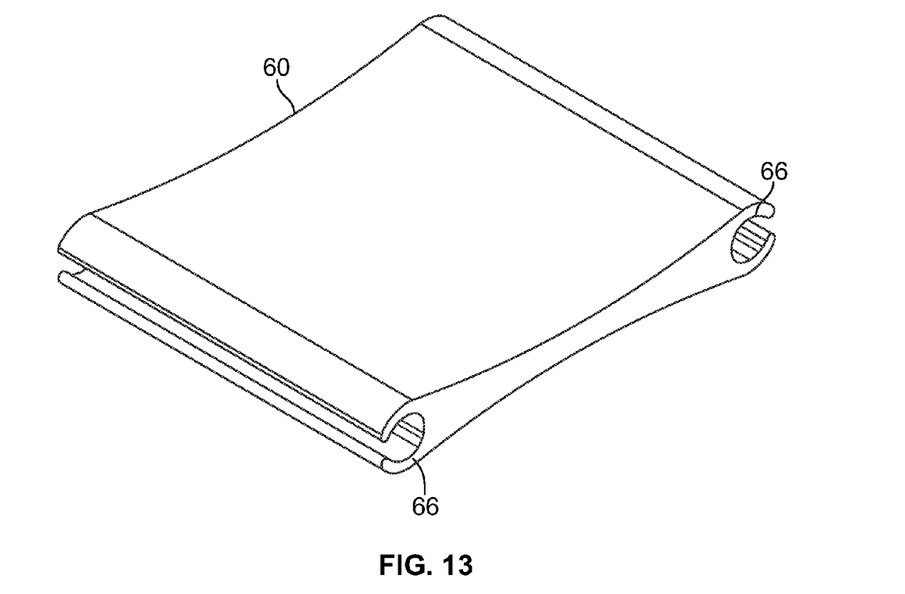
FIG. 13 is a perspective view of a spacer plate of the vehicle cab suspension of FIG. 1.
Figure 14:
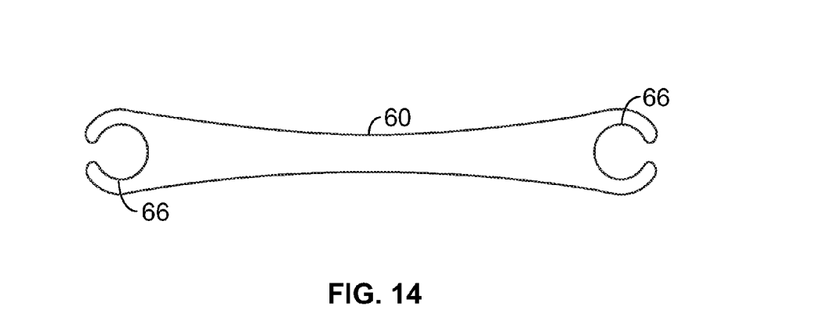
FIG. 14 is a side elevational view of the spacer plate of FIG. 13.

The vehicle cab suspension 10 may further include one or more spacer plates 60, an exemplary one of which is illustrated in greater detail in FIGS. 13 and 14. In the illustrated embodiment, two spacer plates 60 are provided, with one positioned at or adjacent to a leading end 62 of the body pieces 14 and 16 and the other positioned at or adjacent to a trailing end 64 of the body pieces 14 and 16 (FIG. 1). The illustrated spacer plates 60 determine the separation between the generally vertical portions 28 of the body pieces 14 and 16. Accordingly, it may be preferred to select spacer plates 60 having a width (in the direction between the vertical portions 28 of the body pieces 14 and 16) that is less than the combined width of the resilient members 20 and 22 in their uncompressed condition. Selecting spacer plates 60 with such a width ensures that the resilient members 20 and 22 are in a compressed condition when the vertical portions 28 of the body pieces 14 and 16 are tightened against the spacer plates 60, In other embodiments, more or fewer than two spacer plates 60 may be provided. Each spacer plate 60 may be configured to extend between the generally vertical portions 28 of the first and second body pieces 14 and 16, thereby providing the body 12 formed by the body pieces 14 and 16 with additional stiffness and strength and further serving to prevent debris from entering into the interior of the vehicle cab suspension 10.

If the body pieces 14 and 16 are connected by mechanical fasteners, the spacer plate 60 may include features adapted to receive or accommodate the fasteners. For example, in the illustrated embodiment, the body pieces 14 and 16 are connected by a total of four mechanical fasteners 56, with two mechanical fasteners 56 located at or adjacent to the leading end 62 of the body pieces 14 and 16 and two mechanical fasteners 56 located at or adjacent to the trailing end 64 of the body pieces 14 and 16. In this case, the two spacer plates 60 include upper and lower grooves or channels 66 (FIGS. 13 and 14) for receiving the fasteners 56. If the body pieces 14 and 16 are connected by differently configured fasteners or other means, the spacer plates employed therewith may be differently configured from those illustrated in FIGS. 13 and 14 to better cooperate with the connection means.

The mounting member 18 of the vehicle cab suspension 10 is illustrated in greater detail in FIGS. 9-12. The mounting member 18 has an upper or top end 68 and a lower or bottom end 70 connected by a midsection 72. In the illustrated embodiment, the mounting member 18 has a generally T-shaped cross-section or profile (FIG. 11), with a relatively wide upper end 68, a lower end 70 that is narrower than the upper end 68, and a midsection 72 that is narrower than the lower end 70. It may be advantageous for the lower end 70 to be relatively wide to act as a positive stop when the mounting member 18 moves in an upward vertical direction. In particular, a head-on collision may tend to cause the vehicle cab to pivot forward, thereby moving the mounting member 18 (which is secured to the cab) to move upwardly with respect to the remainder of the vehicle cab suspension 10. In combination with the presence of the inner ends 48 of the resilient members 20 and 22, a relatively wide lower end 70 is unable to pass through the gap between the upper projections 38 at a given upward force, thereby acting as a positive stop in the event of a head-on collision, By adjusting the width of the lower end 70 and/or the durometer of the resilient members 20 and 22, the upward force that the vehicle cab suspension 10 is capable of resisting may be adjusted to the needs of the particular vehicle into which the vehicle cab suspension 10 is to be incorporated. In other embodiments, the mounting member may be differently configured, for example, having a lower end with substantially the same width as the upper end or a greater width than the upper end. It is also within the scope of the present disclosure for the midsection to be as wide or wider than either or both of the upper and lower ends.

In the illustrated embodiment, the upper end 68 of the mounting member 18 is configured to be attached to a portion of a vehicle cab. The upper end 68 of the mounting member 18 is shown as being generally flat or planar, which may be advantageous when connecting the mounting member 18 to a flat or planar portion of the vehicle cab, but the upper end of the mounting member may be differently configured to better mate with the corresponding portion of the vehicle cab. The upper end 68 of the mounting member 18 may include other features for better securing the mounting member 18 to the vehicle cab. For example, in the illustrated embodiment, the upper end 68 of the mounting member 18 is provided with a plurality of openings or holes 74 extending therethrough for receiving mechanical fasteners to secure the mounting member 18 to the vehicle cab. Other means may be employed for securing the mounting member 18 to the vehicle cab (e.g., a welding operation), but it may be preferable for the mounting member 18 to be removably secured to the vehicle cab to allow the vehicle cab suspension 10 to be removed from the vehicle cab for servicing.

The midsection 72 of the mounting member 18 is configured for attachment of the inner ends 48 of the resilient members 20 and 22, as shown in FIG. 4. In one embodiment, the lateral sides of the midsection 72 include a pocket or indentation 76 configured to receive at least a portion of the inner end 48 of the associated resilient member 20, 22.

Similarly, the inner surfaces 36 of the generally vertical portions 28 of the body pieces 14 and 16 may include a pocket or indentation 78 (FIGS. 5-8) configured to receive at least a portion of the outer end 50 of the associated resilient member 20, 22.

The ends 48 and 50 of the resilient members 20 and 22 may be configured to be attached to the mounting member 18 and body 12 by any of a number of means. For example, the resilient members 20 and 22 may be configured to be secured within the pockets 76 and 78 (if provided) by a press fit or friction fit, which simplifies installation and removal of the resilient members 20 and 22. In other embodiments, the resilient members 20 and 22 may be more permanently secured to the mounting member 18 and/or the body 12, such as by an adhesion process or by otherwise forming a material bond between the resilient member 20, 22 and the mounting member 18 or body 12 (e.g., a metal-to-rubber bond if the resilient members 20 and 22 are comprised of a rubber material). It is also within the scope of the present disclosure for the resilient members 20 and 22 to be connected to the mounting member 18 and body 12 by different means, for example, by securing the resilient members 20 and 22 to the mounting member 18 by permanent means and to the body 12 by non-permanent means.

The nature of the resilient members 20 and 22 may affect the means by which they are attached to the mounting member 18 and the body 12. For example, if the resilient members 20 and 22 are substantially entirely comprised of an elastomeric material, such as rubber, or at least have ends 48 and 50 comprised of an elastomeric material, the means by which they are attached to the mounting member 18 and the body 12 may be different from what would be preferred or possible if one or both of the ends 48 and 50 of the resilient members 20 and 22 are instead formed from a relatively rigid material (e.g., a metal plate). Hence, the present disclosure is not limited to a particular means of connecting the resilient members 20 and 22 to the mounting member 18 and the body 12.

As for the lower end 70 of the mounting member 18, it is oriented to face the bottom of the body 12 or the generally horizontal portions 26 of the body pieces 14 and 16, but to not come into contact therewith during use. As described in greater detail above, the resilient members 20 and 22 are configured to come into contact with the lower projections 40 upon sufficient downward deformation of the resilient members 20 and 22 and downward movement of the mounting member 18. The mounting member 18 is preferably formed from a relatively rigid material (such as a metallic material), so the vehicle cab suspension 10 is configured to avoid the mounting member 18 "bottoming out" by the lower end 70 coming into metal-to-metal contact with the bottom of the body 12 or the generally horizontal portions 26 of the body pieces 14 and 16. If the mounting member 18 "bottoms out," the metal-to-metal contact between the mounting member 18 and the body 12 results in a rigid (i.e., non-resilient) connection between the vehicle frame 24 (which is rigidly secured to the body 12) and the vehicle cab (which is rigidly secured to the mounting member 18). Avoiding a rigid connection is an aspect of the present disclosure because, in such a situation, all of the impacts and vibrations experienced by the vehicle frame 24 are directly transferred to the vehicle cab, rather than being dissipated or absorbed. Accordingly, the lower end 70 of the mounting member 18 is preferably configured so as to not come into contact with the body 12 under even extreme loading conditions.

Designing the vehicle cab suspension 10 to avoid "bottoming out" depends on a number of factors, including the location and configuration of the lower projections 40 and the resilient members 20 and 22, as described in greater detail above. Additionally, the lower end 70 of the mounting member 18 is less likely to come into contact with the body 12 if it is positioned relatively close to the location at which the resilient members 20 and 22 connect to the midsection 72. For example, FIG. 4 shows that the resilient members 20 and 22 are connected to the midsection 72 at a location relatively close to the lower end 70 of the mounting member 18. In comparison, if the lower end 70 of the mounting member 18 was positioned twice as far away from resilient member 20 and 22, it would be closer to the bottom of the body 12 and, thus, more likely to come into contact therewith in extreme loading conditions.

In one manner of associating the vehicle cab suspension 10 to a vehicle, the vehicle cab suspension 10 is assembled and secured to the vehicle frame 24 and vehicle cab. Alternatively, rather than being fully assembled and then secured to the vehicle frame 24 and vehicle cab, the vehicle cab suspension 10 may be only partially assembled at the time it is secured to the vehicle frame 24 and/or the vehicle cab. While only one vehicle cab suspension 10 is illustrated, it should be understood that a plurality of vehicle cab suspensions 10 may be connected to the vehicle cab and the vehicle frame 24. If two or more vehicle cab suspensions are used, they may either be identical or differently configured. In one example, if a front end of the vehicle cab is connected by a hinge or pivot to the vehicle frame 24, it may be advantageous to employ two vehicle cab suspension 10, with one positioned at or adjacent to each rear corner of the vehicle cab to connect the rear of the vehicle cab to the vehicle frame 24. Using a plurality of vehicle cab suspensions may be preferred to using a single vehicle cab suspension, as the load is distributed amongst them (thereby decreasing the load on any individual vehicle cab suspension) and a multiple suspension system may have improved balance. However, it should also be understood that there may be circumstances in which it would be advantageous to employ a single vehicle cab suspension instead of a plurality of vehicle cab suspensions.

With the vehicle cab loaded onto the vehicle cab suspension 10, the vehicle cab suspension 10 moves from an unloaded condition (FIG. 4) to a loaded condition in which the mounting member 18 is at a lower elevation due to the weight of the vehicle cab. The resilient members 20 and 22 are downwardly deformed, with their outer ends 50 remaining in place at the location at which they are secured to the body 12, and with the inner ends 48 at a lower elevation to correspond to the position of the mounting member 18 (to which the inner ends 48 are attached). Generally speaking, the mounting member 18 continues to move downwardly until the resistive force of the resilient members 20 and 22 matches the weight of the vehicle cab. In a preferred embodiment, the vehicle cab suspension 10 is configured such that, in a loaded condition, the resilient members 20 and 22 assume a more horizontal orientation, with the lower end 70 of the mounting member 18 spaced away from the bottom of the body 12.

During use, the vehicle frame 24 experiences shocks, impacts, and vibrations that are transmitted to the body 12 of the vehicle cab suspension 10. The forces experienced by the body 12 are transmitted to the mounting member 18 by the resilient members 20 and 22. The resilient members 20 and 22 absorb a portion of the forces, rather than transmitting them on a 1:1 basis, as a rigid interconnection would, such that the forces experienced by the mounting member 18 amount to a modified, lesser version of the forces experienced by the vehicle frame 24. The forces experienced by the mounting member 18 are directly transmitted to the vehicle cab, such that the forces experienced by the vehicle cab are less extreme than the original forces experienced by the vehicle frame 24.

As forces are transmitted to the mounting member 18, it moves upwardly and downwardly with the deforming resilient members 20 and 22. Upon a sufficiently large force, the resilient members 20 and 22 may be brought into contact with the upper projections 38 or the lower projections 40. The contact between the resilient members 20 and 22 and the projections 38, 40 limits the total range of vertical travel available to the mounting member 18 (and, hence, the vehicle cab) with respect to the body 12 and vehicle frame 24. In a preferred embodiment, the separation between the lower end 70 of the mounting member 18 and the bottom of the body 12 is greater than the separation between the resilient members 20 and 22 and the lower projections 40, such that the resilient members 20 and 22 come into contact with the lower projections 40 prior to the mounting member 18 coming into contact with the bottom of the body 12. Most preferably, the separation between the lower end 70 of the mounting member 18 and the bottom of the body 12 is sufficiently great (and the other design and environmental factors that affect the downward travel of the mounting member 18 are adequately accounted for) such that the two will not come into contact during use, even upon extreme shocks to the vehicle frame 24. By such a configuration, the vehicle cab suspension 10 avoids "bottoming out" and directly transmitting forces between the vehicle frame 24 and the vehicle cab.

It will be understood that the embodiments described above are illustrative of some of the applications of the principles of the present subject matter. Numerous modifications may be made by those skilled in the art without departing from the spirit and scope of the claimed subject matter, including those combinations of features that are individually disclosed or claimed herein. For these reasons, the scope hereof is not limited to the above description but is as set forth in the following claims, and it is understood that claims may be directed to the features hereof, including as combinations of features that are individually disclosed or claimed herein.

The invention claimed is:

1. A vehicle cab suspension comprising:
a body comprising a first body piece fixedly and removably secured to, and in contact with, a second body piece;
a mounting member positioned at least partially within the body and at least partially above or below the body;
a first resilient member that connects the body to the mounting member and that extends from the body to the mounting member; and
a first spacer plate extending between the first and second body pieces and removably connected in fixed relation to, and in contact with, the first and second body pieces;
wherein the first resilient member is placed in a compressed condition between the body and the mounting member by the connection of the first and second body pieces when the vehicle cab suspension is in an unloaded condition.

2. The vehicle cab suspension of claim 1, further comprising a second resilient member, wherein the first resilient member connects the first body piece to the mounting member and extends from the first body piece to the mounting member,
the second resilient member connects the second body piece to the mounting member and extends from the second body piece to the mounting member, and
each one of the first and second resilient members is placed in a compressed condition between the associated body piece and the mounting member when the vehicle cab suspension is in an unloaded condition.

3. The vehicle cab suspension of claim 1, wherein the first resilient member comprises
a substantially vertical end surface connected to the body;
another substantially vertical end surface connected to the mounting member; and
a cross-section defining a generally rhomboidal shape when the vehicle cab suspension is in an unloaded condition.

4. The vehicle cab suspension of claim 1, wherein the first resilient member connects to the body at a location having a different elevation than the location at which the first resilient member connects to the mounting member when the vehicle cab suspension is in an unloaded condition.

5. The vehicle cab suspension of claim 4, wherein the first resilient member connects to the body at a location having a lower elevation than the location the first resilient member connects to the mounting member when the vehicle cab suspension is in an unloaded condition.

6. The vehicle cab suspension of claim 1, wherein the body includes a first upper projection configured to restrict movement of the first resilient member during use.

7. The vehicle cab suspension of claim 6, further comprising a second upper projection, wherein
the first and second upper projections define a gap therebetween,
the mounting member includes a lower end that is wider than a midsection of the mounting member, and
the lower end of the mounting member, in combination with the first resilient member, is configured to be unable to pass through the gap defined between the upper projections.

8. The vehicle cab suspension of claim 1, wherein the body includes a lower projection configured to restrict movement of the first resilient member during use.

9. The vehicle cab suspension of claim 8, wherein
the mounting member includes a lower end and
the first resilient member is configured to come into contact with the lower projection prior to the lower end of the mounting member coming into contact with the body.

10. The vehicle cab suspension of claim 8, wherein
the body includes a first upper projection configured to restrict movement of the first resilient member during use and
the first resilient member is positioned closer to the first upper projection than to the lower projection when the vehicle cab suspension is in an unloaded condition.

11. The vehicle cab suspension of claim 1, further comprising a second resilient member that extends from the body to the mounting member and connects the body to the mounting member, said first and second resilient members having a combined width in an uncompressed condition in a direction extending between the first and second body pieces, wherein the width of the first spacer plate is less than said combined width of said first and second resilient members, such that connecting the first and second body pieces to the body and the mounting member places the resilient members in a compressed condition.

12. The vehicle cab suspension of claim 1 wherein the mounting member includes a pocket or indentation configured to receive at least a portion of the first resilient member.

13. A vehicle cab suspension comprising:
a body including an upwardly facing surface, said body connected to one of a vehicle frame or a vehicle cab;
a mounting member positioned at least partially within the body, said mounting member connected to the other one of the vehicle frame or the vehicle cab; and
first and second resilient members, each of which connects the body to the mounting member and extends from the body to the mounting member, wherein the body includes a lower projection including an upper surface positioned above the upwardly facing surface of the body, and positioned below and spaced away from the first and second resilient members and configured to contact said at least one of the first and second resilient members upon sufficient downward movement of said at least one of the first and second resilient members to restrict movement of said at least one of the first and second resilient members during use.

14. The vehicle cab suspension of claim 13, wherein the upper surface of the lower projection is non-horizontal.

15. The vehicle cab suspension of claim 13, wherein there is a non-uniform distance separating the upper surface of the lower projection and a lower surface of said at least one of the first and second resilient members when the vehicle cab suspension is in an unloaded condition.

16. The vehicle cab suspension of claim 13, wherein the lower projection is integrally formed with the body.

17. The vehicle cab suspension of claim 13, wherein
the body is comprised of a first body piece connected to a second body piece,
the first body piece includes a first upper projection and the lower projection configured to restrict movement of the first resilient member during use, and
the second body piece includes a second upper projection and a second lower projection configured to restrict movement of the second resilient member during use.

18. The vehicle cab suspension of claim 13 wherein the first and second resilient members each have an inner end surface connecting the resilient member to the mounting member and an outer end surface connecting the resilient member to the body, and with respect to each of the first and second resilient members, the outer end surface is positioned at a lower elevation than the inner end surface.

19. A vehicle cab suspension comprising:
a body comprising a first wall and a second wall, the first wall spaced apart and positioned in fixed relation to the second wall, said body connected to one of a vehicle frame or a vehicle cab;
a mounting member positioned at least partially within the body, said mounting member connected to the other one of the vehicle frame or the vehicle cab; and
a plurality of resilient members, each of which connects the body to the mounting member and extends from the body to the mounting member, wherein the body includes a first upper projection positioned above and spaced away from the plurality of resilient members, and said first upper projection includes a lower surface configured to contact at least one of the plurality of resilient members upon sufficient upward movement of said at least one of the plurality of members to restrict movement of said at least one of the plurality of resilient members during use.

20. The vehicle cab suspension of claim 19, wherein the lower surface of the first upper projection is non-horizontal.

21. The vehicle cab suspension of claim 19, wherein
the upper projection includes a lower surface configured to contact an upper surface of said at least one of the plurality of resilient members upon sufficient upward movement of said at least one of the plurality of resilient members and
there is a non-uniform distance separating the lower surface of the first upper projection and the upper surface of said at least one of the plurality of resilient members when the vehicle cab suspension is in an unloaded condition.

22. The vehicle cab suspension of claim 19, wherein the first upper projection is integrally formed with the body.

23. The vehicle cab suspension of claim 19, wherein
the body further includes a second upper projection,
the upper projections define a gap therebetween,
the mounting member includes a lower end that is wider than a midsection of the mounting member, and
the lower end of the mounting member, in combination with the plurality of resilient members, is configured to be unable to pass through the gap defined between the first and second upper projections.

* * * * *